Ｕｎｉｔｅｄ Ｓｔａｔｅｓ Ｐａｔｅｎｔ [19]

Naftzger

[11] Patent Number: 5,924,078
[45] Date of Patent: Jul. 13, 1999

[54] CONSUMER-PROVIDED PROMOTIONAL CODE ACTUATABLE POINT-OF-SALE DISCOUNTING SYSTEM

[75] Inventor: Walter L. Naftzger, Dallas, Tex.

[73] Assignee: Codesaver International, Inc., Dallas, Tex.

[21] Appl. No.: 08/671,723

[22] Filed: Jun. 28, 1996

[51] Int. Cl.⁶ .................................................. G06K 15/00
[52] U.S. Cl. .................................. 705/16; 705/14; 705/18
[58] Field of Search .............................. 705/14; 235/375, 235/383; 345/156; 364/401

[56] References Cited

U.S. PATENT DOCUMENTS

| Re. 34,915 | 4/1995 | Nichtberger et al. | 364/401 |
|---|---|---|---|
| 4,554,446 | 11/1985 | Murphy et al. | 235/487 |
| 4,674,041 | 6/1987 | Lemon et al. | 705/14 |
| 4,821,186 | 4/1989 | Munakata et al. | 705/14 |
| 4,882,675 | 11/1989 | Nichtberger et al. | 705/14 |
| 5,053,957 | 10/1991 | Suzuki | 705/14 |
| 5,173,851 | 12/1992 | Off et al. | 705/14 |
| 5,185,695 | 2/1993 | Pruchnicki | 705/14 |
| 5,192,854 | 3/1993 | Counts | 235/375 |
| 5,201,010 | 4/1993 | Deaton et al. | 382/139 |
| 5,249,044 | 9/1993 | Von Kohorn | 348/12 |
| 5,380,991 | 1/1995 | Valencia et al. | 235/383 |
| 5,420,606 | 5/1995 | Begum et al. | 345/156 |
| 5,515,270 | 5/1996 | Weinblatt | 705/14 |

Primary Examiner—Allen R. MacDonald
Assistant Examiner—Jagdish Patel
Attorney, Agent, or Firm—L. Dan Tucker

[57] ABSTRACT

A computer-implemented discounting system suitable for use in conjunction with a point-of-sale transaction device. The discounting system includes a memory subsystem for storing information related to at least one promotion and a software module coupled to the memory subsystem. The software module receives promotional codes entered by consumers and determines if the promotional codes relate to the promotions for which information is stored in the memory subsystem. If so, the software module transmits discount information for the promotions related to the entered promotional codes to the point-of-sale transaction device. For each promotion, a promotional code, a promotion period, a product code, a discount amount, a promotional code count and a maximum number of promotional codes are stored in the memory subsystem. The software module compares the received promotional codes with the promotional codes stored in the memory subsystem and, if the received promotional codes matches one of the stored promotional codes, was received during the promotion period and if the promotion code count, which is incremented each time a matching promotional code was received during the promotion period, does not exceed the maximum number of promotional codes, the product code and the discount amount are transmitted to the point-of-sale transactional device. There, the cost of the point-of-sale transaction is reduced by the discount amount if a product matching the transmitted product code has been purchased.

38 Claims, 5 Drawing Sheets

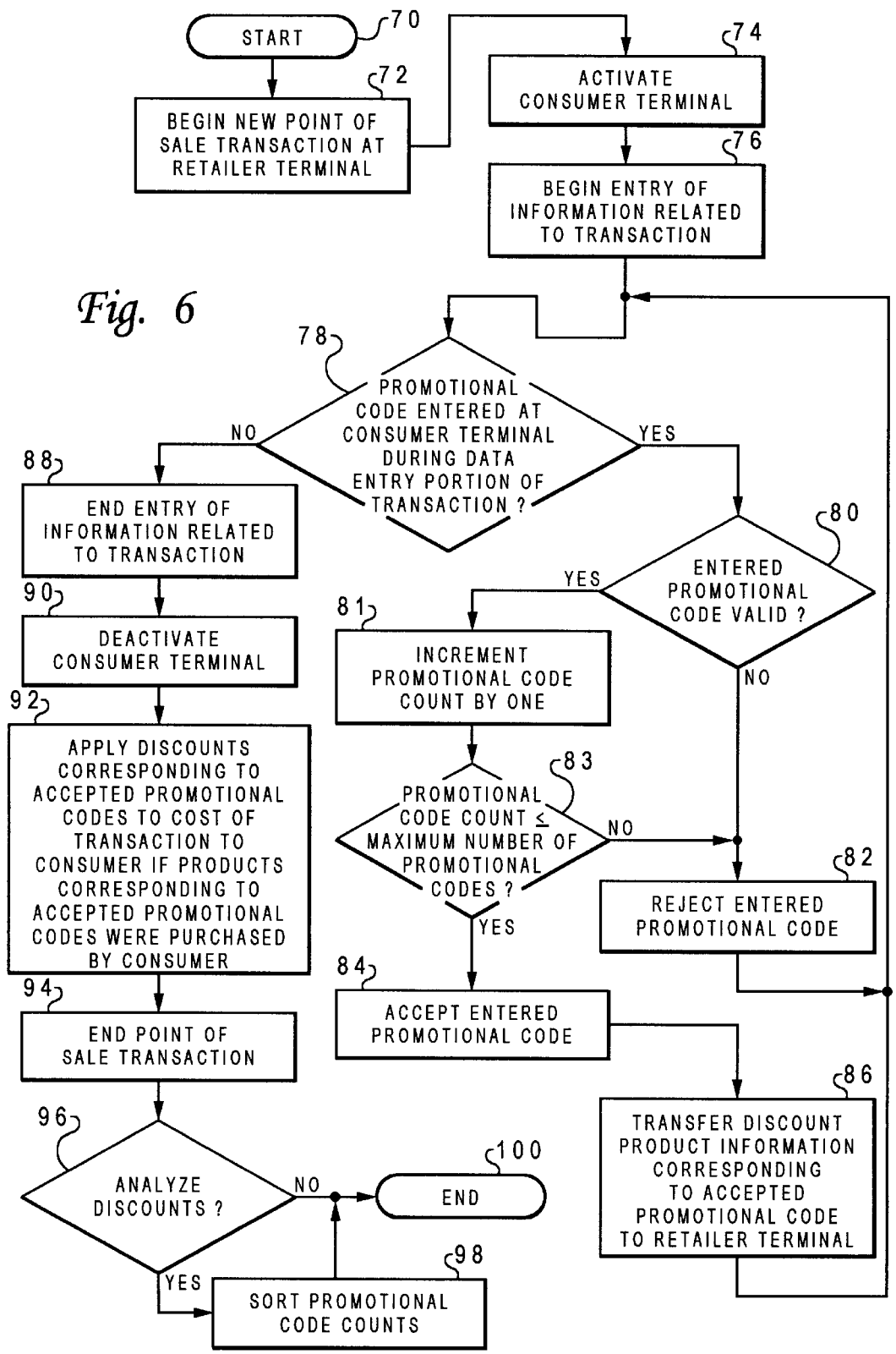

CONSUMER-PROVIDED PROMOTIONAL CODE ACTUATABLE POINT-OF-SALE DISCOUNTING SYSTEM

BACKGROUND OF THE INVENTION

1. Field of the Invention

The present invention generally relates to point-of-sale discounting systems and, more particularly, relates to a point-of-sale discounting system in which a discount is applied to a transaction in response to a consumer electronically providing a promotional code to the system used by the retailer to record the transaction.

2. Description of Related Art

Retailers have long relied upon the discounting of goods as a method to attract consumers to their establishment. For example, a retailer may reduce the price of selected goods and, using the local media, encourage consumers to visit their store by advertising the selected price reductions. Oftentimes these discounts, generally referred to as "specials", are quite substantial and cause the retailer to lose money on each sale of the discounted goods. The retailer recoups this loss from profits on other, non-discounted goods purchased by the consumer during their visit.

While widely utilized, advertised specials are disliked by many retailers because of its inability to discriminate between the price-conscious and casual consumers. Specifically, the advertised price reduction will motivate the price-conscious consumer into visiting the store with the intent of purchasing the discounted items. Thus, the loss taken on the sale of the discounted items are necessary in order to receive the profit on the sale of other goods to the price-conscious consumer. The casual consumer, on the other hand, visits the store to purchase goods without intending to purchase the discounted item. Upon discovering the discounted items on the shelves of the store, the casual consumer will often decide to purchase these items. Furthermore, discounted items are sometimes purchased by casual consumers who are entirely unaware of the discount. As a result, therefore, the retailer must absorb the loss on sales of the discounted items to consumers who visit the store with or without knowledge of the discount.

Coupons are often used to restrict discounts to price-conscious consumers. More specifically, in order to receive the discount on a selected item, the consumer must provide the retailer with a coupon clipped from an advertisement run in the print media. In this manner, the retailer limits the discount to those consumers sufficiently price-conscious to "clip" coupons. There are, however, a number of drawbacks to the use of coupons. First, coupons are generally limited to the print media. Thus, if the retailer relies solely on coupons to motivate price-conscious consumers to visit the store, those consumers who only use radio or television for news and information will not be reached by print advertisements. The use of coupons also lengthen the time required to complete a transaction. Specifically, after subtotaling the consumer's purchases, the cashier must then enter a discount for each coupon proffered by the consumer. To prevent the consumer from fraudulently obtaining discounts, the cashier must check to see if the coupon has expired and whether the consumer has actually purchased the item for which the discount is sought.

Various ways of speeding the discounted transaction, primarily by eliminating the paper coupon, have been proposed. For example, U.S. Pat. No. 5,185,695 to Pruchnicki proposes that paper coupons be eliminated in favor of an automated system in which a coupon list which includes product type, validation period and discount amount is maintained in memory. When products on the coupon list are purchased, the discount is automatically deducted from the purchase price. While successfully eliminating many of the delays associated with the use of paper coupons, the solution proposed by Pruchnicki would be disfavored by many retailers in that the discount is awarded to casual consumers who purchase the goods when visiting the store without prior knowledge of the discount.

It has also been proposed that retailers maintain an electronic display of coupons valid for use in their store. A consumer may select coupons from the display and, if the corresponding items are purchased, the consumer is credited in accordance with the terms of the coupons. In Re. 34,915 to Nichtberger et al., the consumer presents a card which enables the cashier to retrieve the consumer's coupon selections from a central unit. In U.S. Pat. No. 5,420,606 to Begum et al., the coupon selections are maintained in a customer display device which is presented to the cashier at the checkout counter. While Nichtberger et al. and Begum et al. require some price consciousness in that the consumer must devote time into selecting coupons for use from an electronic display, they do not overcome the aforenoted deficiency of Pruchnicki in that the discounts are not used to attract the consumer to the store. Instead, the discounts are made available to all consumers who visit the store and select the coupons.

Several electronic coupon storage and redemption systems which are clearly directed to the price-conscious consumer have been disclosed in the art. U.S. Pat. No. 5,192,854 to Counts is directed to a system which enables consumers to electronically store and redeem coupons. Data stored in the coupon scanner is compared to the products being purchased and, if matching, the consumer is credited with the value of the coupon and the coupon data is removed from the scanner. U.S. Pat. No. 5,380,991 to Valencia et al. discloses the use of a so-called "smart" card capable of electronically carrying a number of paperless electronic coupons. After the consumer's purchases are scanned and totaled, the card is inserted into a master reader/writer which retrieves potential discounting information from the card. Neither of these systems, however, directly motivate a consumer to, in response to a specific advertised promotion, visit a particular store to take advantage of the promotion. Counts merely enables a consumer to electronically collect coupons of all types while Valencia et al. is designed to encourage repeat patronage of a store and/or product.

It may be readily seen from the foregoing that it would be desirable to provide a point-of-sale discounting system in which the consumer uses publicly distributed promotional codes while the sales transaction is on-going to automatically receive discounts on purchased goods. It is, therefore, the object of the invention to provide such a point-of-sale discounting system.

SUMMARY OF THE INVENTION

In one embodiment, the present invention is directed to a computer-implemented discounting system which accepts promotional codes entered as a series of characters. A software module receives the promotional codes and, using information related to at least one promotion stored in a memory subsystem coupled thereto, determines if the entered promotional codes relate to one of the promotions. If so, discount information is transmitted to an associated point-of-sale transaction device.

In one aspect thereof, the information stored in the memory subsystem includes, for each one of the promotions, a promotional code, a product code and a discount amount. The software module compares the received promotional code with the promotional codes stored in the memory subsystem and, if the received promotional code matches one of the promotional codes stored in the memory subsystem, transfers the product code and the discount amount corresponding to the matched promotional code to the point-of-sale transactional device.

In another aspect thereof, the information stored in the memory subsystem includes, for each one of the promotions, a promotion period. In this aspect, the software module transfers the product code and discount amount only if it determines that the received promotional code matching one of the promotional codes was received during the promotion period.

In yet another aspect thereof, the information stored in the memory subsystem includes, for each one of the promotions, a promotional code count of a total number of times that the promotional code has been received and a maximum number of promotional codes. In this aspect, the software module transfers the product code and discount amount only if it determines that promotional code count does not exceed the maximum number of promotional codes.

In another embodiment, the present invention is of a computer-implemented discounting system suitable for use in conjunction with a point-of-sale transaction device. In one configuration thereof, the discounting system includes a keypad for accepting promotional codes entered by consumers. In an alternate configuration thereof, the discounting system includes a microphone for accepting promotional codes audiblilized by consumers and means for converting the audibilized promotional codes into corresponding digital messages. In either of these configurations, the discounting system further includes a memory subsystem for storing information related to at least one promotion and a software module coupled to the memory subsystem and either the keypad or converting means. The software module receives the promotional codes entered by consumers or the digital messages converted from audibilized promotional codes and determines if the promotional codes relate to the promotions for which information is stored in the memory subsystem. If so, the software module transmits discount information for the promotions related to the entered promotional codes to the point-of-sale transaction device.

In certain aspects thereof, the information stored in the memory subsystem includes a promotional code, a product code and a discount amount for each promotion stored in the memory subsystem. The software module compares the received promotional codes with the promotional codes stored in the memory subsystem and, if the received promotional codes match one of the promotional codes stored in the memory subsystem, the software module transfers the product code and the discount amount corresponding to the matched promotional code to the point-of-sale transactional device.

In other aspects thereof, the information stored in the memory subsystem further includes a promotion period for each promotion. If the received promotional code matches one of the promotional codes stored in the memory subsystem, the software module determines, if the received promotional code was received during the promotion period corresponding to the matching promotional code. If so, the product code discount amount corresponding to the matched promotional code are transferred to the point-of-sale transactional device. Preferably, the promotion period includes a promotion start time/date and a promotion end time/date for each of the promotions. The product code and discount amount corresponding to the matched promotional code would are transferred to the point-of-sale transactional system if the received promotional code was received after the promotion start time/date but before the promotion end time/date. In still another aspect thereof, the information related to promotions stored in the memory subsystem include a promotional code count of a total number of times that the promotional code has been received and a maximum number of promotional codes. The product code and discount amount corresponding to the matched promotional code are transferred to the point-of-sale transactional system if the promotional code count does not exceed the maximum number of promotional codes.

In certain further aspects thereof, the software module which performs certain of the aforementioned tasks is executed by a processor subsystem coupled between the keypad and the memory subsystem. Further, the keypad may include a plurality of keys, each representing an alpha-numeric character such that each promotional codes may be comprised of a different series of alpha-numeric characters generated by depressing selected ones of the keys and/or a control key which, when depressed, indicates that the series of alpha-numeric characters generated by depressing selected ones of the plurality of keys thereafter, is a promotional code.

In yet another embodiment, the present invention is of a point-of-sale transactional system which includes a transactional device for performing point-of-sale transactions, a consumer interface for accepting codes entered by consumers and a discounting device coupled to the consumer interface and the transactional device. The discounting device includes a first software module which receives codes from the consumer interface, determines if the received codes are promotional codes and transmits discount information, for each determined promotional code, to the transactional device. The transactional device includes a second software module which performs the point-of-sale transaction using the discount information received from the discounting device.

In one aspect thereof, the transactional device includes means for activating the discounting device upon initiation of a data entry portion of a point-of-sale transaction and deactivating the discounting device upon completion of the data entry portion of the point-of-sale transaction such that the discounting device is capable of accepting codes from consumers only when activated.

In another aspect thereof, the discounting device includes a memory subsystem in which at least one promotional code and corresponding discount amounts are stored. In this aspect, the first software module compares the received codes with the promotional codes stored in the memory subsystem and transmits, to the second software module, the discount amount corresponding to a first promotional code if the received code matches the first promotional code.

In an alternate aspect thereof, the discounting device includes a memory subsystem in which at least one promotional code, together with corresponding promotion periods and discount amounts are stored. In this aspect, the first software module compares the received codes with the promotional codes stored in the memory subsystem and transmits, to the second software module, the discount amount corresponding to a first promotional code if the received code matches the first promotional code and was received within the promotion period.

In another alternate aspect thereof, the discounting device includes a memory subsystem in which at least one promotional code, together with corresponding promotion periods, product codes and discount amounts are stored. In this aspect, the first software module compares the received codes with the promotional codes stored in the memory subsystem and transmits, to the second software module, the product code and the discount amount corresponding to a first promotional code if the received code matches the first promotional code and was received within the promotion period. The second software module reduces the cost of the point-of-sale transaction by the discount amount if an item having the product code transmitted to the second software module was purchased during the point-of-sale transaction.

In still another alternate aspect thereof, the discounting device includes a memory subsystem in which at least one promotional code, together with corresponding promotion periods, product codes, discount amounts, promotional code counts and maximum number of promotional codes are stored. In this aspect, the first software module compares the received codes with the promotional codes stored in the memory subsystem and transmits, to the second software module, the product code and the discount amount corresponding to a first promotional code if the received code matches the first promotional code, was received within the promotion period and the promotional code count does not exceed the maximum number of promotional codes. The second software module reduces the cost of the point-of-sale transaction by the discount amount if an item having the product code transmitted to the second software module was purchased during the point-of-sale transaction.

In still another embodiment, the present invention is of a computer-implemented method of discounting an on-going point-of-sale transaction. A series of promotional codes and a corresponding series of promotional information entries are stored in a memory subsystem of a computer system. A promotional code, entered by a consumer on a keypad coupled to the computer system, is received. The received promotional code is compared to the series of promotional codes stored in the memory subsystem and, if the received promotional code matches one of the series of stored promotional codes, the promotional information entry corresponding to the matched promotional code is transmitted to a point-of-sale discounting device. There, the cost of the point-of-sale transaction is discounted using the transmitted promotional information.

In one aspect, the transmitted promotional information includes a product code and a discount amount. Here, a product code for each product to be purchased as part of the point-of-sale transaction is compared to the transmitted product code and the cost of the point-of-sale transaction is reduced by the discount amount if the transmitted product code matches the product code for one of the products to be purchased.

In another aspect, the promotional information entries include a promotion period. Here, the product code and discount amount are transmitted to the point-of-sale discounting device only if the matching promotional code was received within the corresponding promotion period. In a further aspect thereof, the promotion period is comprised of a promotion start time/date and a promotion end time/date. If so, the product code and discount amount are transmitted to the point-of-sale discounting device only if the matching promotional code was received after the promotion start time/date and before the promotion end time/date.

In still another aspect, the promotional information entries include a promotional code count and a maximum number of promotional codes. Each time a matching promotional code is received, the corresponding promotional code count is incremented. The product code and discount amount corresponding to the matching promotional code are transmitted to the point-of-sale discounting device only if the promotional code count does not exceed the maximum number of promotional codes.

BRIEF DESCRIPTION OF THE DRAWINGS

The present invention may be better understood, and its numerous objects, features and advantages will become apparent to those skilled in the art by reference to the accompanying drawing, in which:

FIG. 6 is a flow chart of a method of providing point-of-sale discounts to consumers entering valid promotional codes into the consumer-provided promotional code actuatable point-of-sale discounting system of FIGS. 1 and 3.

DETAILED DESCRIPTION

Figure 1:
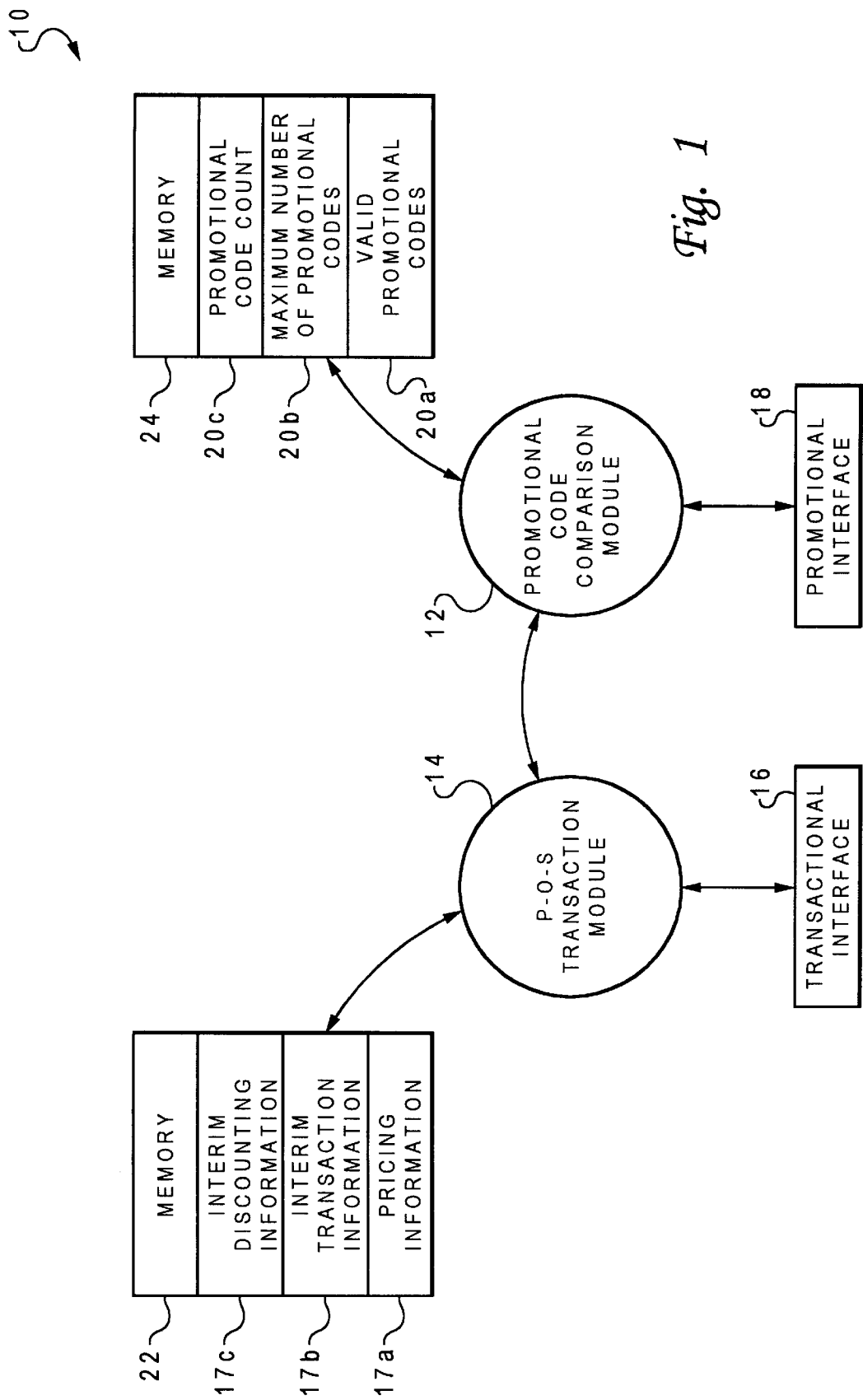
FIG. 1 is a block diagram of a software-based, consumer-provided promotional code actuatable point-of-sale discounting system constructed in accordance with the teachings of the present invention.

Referring first to FIG. 1, a software-based, consumer-provided promotional code actuatable point-of-sale discounting system 10 will now be described in greater detail. The software-based point-of-sale discounting system 10 includes a software module 12 executable by a processor subsystem (not shown in FIG. 1) of a computer. In alternate embodiments of the invention, it is contemplated that the processor subsystem in which the software module 12 resides may be part of a human operated, point-of-sale transactional system, for example, a stand-alone electronic cash register, also referred to as an "ECR", operated by the retailer and having a consumer interface incorporated therewith, a human operated, promotional discounting device operated by the consumer and coupled to a point-of-sale transactional system, a computer system networked to a series of the promotional discounting devices and/or point-of-sale transactional systems, or an automated transactional system such as a vending machine. As will be more fully described below, the software module 12 interacts with various software and/or hardware devices to provide discounts to consumers who: (1) purchase a particular product; and (2) provide a valid promotional code which corresponds to the purchased product.

The point-of-sale transaction for which the software module 12 provides discount information is handled by software module 14. The software module 14 is point-of-sale transaction software which receives information regarding the transaction, processes the information to determine the cost of the transaction and displays the total cost of the transaction. The point-of-sale transactional software is executable by a processor subsystem (not shown in FIG. 1) of an electronic cash register or other point-of-sale transactional system operated by a retailer or of a computer system networked to each of the electronic cash register or other point-of-sale transactional device operated by the retailer.

While the embodiment of the invention disclosed herein includes first and second software modules 12 and 14, executable by respective processor subsystems 23, 43 and coupled to respective memory subsystems 24, 22, it should be clearly understood that the first and second software modules 12 and 14 may be incorporated into a single software module coupled to both the transactional interface 14 and the promotional interface 16. Such an embodiment would also require only a single processor subsystem to execute the combined software module and a single memory subsystem capable of holding the requisite promotional and transactional information.

The point-of-sale discounting system 10 provides discounts to consumers providing promotional codes thereto in the following manner. A transaction is initiated by transmitting, via transactional interface 16, information regarding the transaction to the software module 14. Typically, a transaction is initiated by the cashier transmitting, via a keypad (not shown in FIG. 1) or other device forming part of the transactional interface 16, a message to the software module 14 indicating that a new transaction is to be initiated. Upon receiving a signal indicating that a new transaction has been initiated, the software module 14 notifies the software module 12 to await promotional codes via the promotional interface 18. In response, the software module 12 activates the promotional interface 18. In alternate embodiments thereof, the software module 12 may activate the promotional interface 18 by powering-up the promotional interface 18, by enabling a previously powered-up promotional interface 18 to transmit signals to the software module 12 or by switching from a first mode of operation in which the software module 12 ignores any signals received from the promotional interface 18 into a second mode of operation in which the software module 12 processes signals received from the promotional interface 18.

Thereafter, the cashier transmits, again via the transactional interface 16, a list of items to be purchased by the consumer. For example, the cashier may transmit the list of items to be purchased by the consumer by passing a product code, for example, a universal product code (or "UPC"), printed on each item to be purchased, over an optical scanner included as part of the transactional interface 16. Alternately, the cashier may manually input a stock keeping unit (or "SKU") code for each item to be purchased using the keypad. To compile a summary of the transaction, the software module 14 retrieves a price for each item identified by the transactional interface 16 as being purchased by the consumer item to be used in compiling a summary of the transaction. For example, pricing information on items offered for sale may be maintained in a first region 17a of a memory subsystem 22 coupled to the electronic cash register in which the software module 14 resides. In alternate embodiments of the invention, the memory subsystem 22 may reside within the electronic cash register or within a network device accessible by plural electronic cash registers. Using the retrieved pricing information, the software module 14 compiles interim transaction information in a second region 17b of the memory subsystem 22. While the information included in the interim transaction information may be readily varied without departing from the scope of the present invention, typically, the interim transaction information will include a list of items purchased, the cost of each item and the total cost of the transaction. Typically, each item to be purchased is listed by its product code.

At the completion of the data entry portion of the transaction, for example, when the cashier has scanned all of the items to be purchased, the cashier completes the transaction, typically by transmitting a message to the software module 14 via the transaction interface 16, for example, the keypad used to notify the software module 14 of the initiation of the transaction, that the transaction is complete. In response thereto, the software module 14 notifies the software module 12 to no longer await promotional codes via the promotional interface 18. In response, the software module 12 deactivates the promotional interface 18. In alternate embodiments thereof, the software module 12 may deactivate the promotional interface 18 by powering-down the promotional interface 18, by disabling the ability of the promotional interface 18 to transmit signals to the software module 12 or by switching from the second mode of operation in which the software module 12 processes signals received from the promotional interface into the first mode of operation in which the software module 12 ignores any signals received from the promotional interface 18.

If, at any time during the data entry portion of the transaction, the software module 12 receives one or more promotional codes via the promotional interface 18, the software module 12 will determine if the received promotional codes are valid. Specifically, for each promotional code received, the software module 12 compares the received promotional code to valid promotional code information stored in a first region 20a of a memory subsystem 24 coupled to the software module 12. The valid promotional code information stored in the first region 20a is comprised of a series of N valid promotional code entries, each having a promotion period and a discount amount appended thereto.

Figure 2:
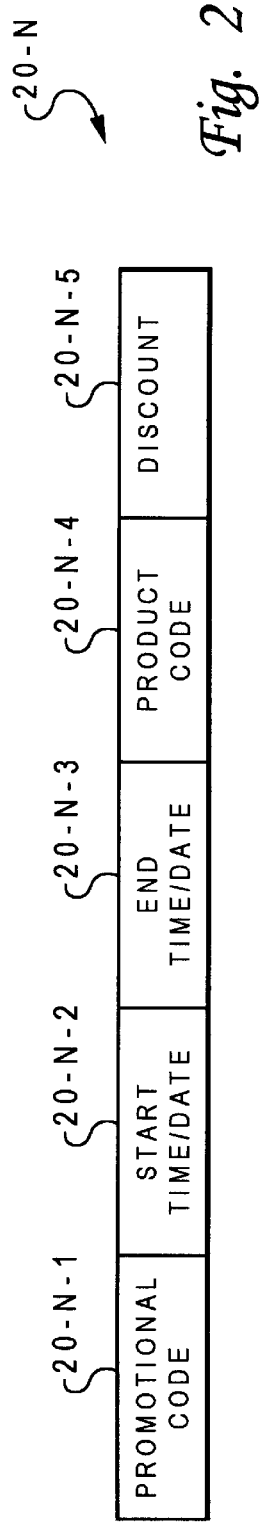
FIG. 2 is a block diagram of a promotional code suitable for use in conjunction with the software-based promotional code actuatable point-of-sale discounting system of FIG. 1.

Referring momentarily to FIG. 2, a typical valid promotional code entry 20-N stored in the first region 20a of the memory subsystem 24 will now be described in greater detail. The valid promotional code entry 20-N includes five fields, a promotional code field 20-N-1, a promotion start time/date field 20-N-2, a promotion end time/date field 20-N-3, a product code field 20-N-4 and a discount amount field 20-N-5.

Referring now, in combination, to FIGS. 1–2, upon receipt of a promotional code via the promotional interface 18, the software module 12 compares the received promotional code to the promotional code held in the promotional code field 20-N-1 of each of the valid promotional code entries 20-N stored in the first region 20a of the memory subsystem 24. For example, the received code may be a 3-digit number such as "123". If one of the promotional codes held in the promotional code field 20-N-1 of one of the valid promotional code entries 20-N matches the received promotional code, the software module 12 determines that a promotional code has been received.

The software module 12 then determines if the promotional code is valid by checking to see if the time at which the promotional code was received is between the promotion start and promotion end times respectively held in the promotion start time/date field 20-N-2 and the promotion end time/date field 20-N-3 of the valid promotional code entry 20-N which includes the matching promotional code in the promotional code field 20-N-1. For example, the promotion start time held in the promotion start time/date field 20-N-2 may be 12:00 AM on Jun. 1, 1996 and the promotion end time held in the promotion end time/date field 20-N-4 may be 11:59 PM on Jun. 30, 1996. If the software module 12 determines that the received promotional code matching the promotional code held in the promotional code field 20-N-1 of one of the valid promotional code entries 20-N was received between the promotion start time and the promotion end time respectively held in the promotion start time/date field 20-N-2 and the promotion end time/date field 20-N-3 of the valid promotional code entry 20-N which includes the matching promotional code in the promotional code field 20-N-1, the received promotional code is deemed valid.

In one embodiment of the invention, validity of the received promotional code is further controlled by a determination as to the number of times that particular promotional code has been received by the software module 12. In this embodiment, for each valid promotional code stored in the first region 20a of the memory subsystem 24, a maximum number of uses of the promotional code is stored in a second region 20b of the memory subsystem 24 and a total number of uses of the promotional code is stored in a third region 20c of the memory subsystem 24. Alternately, the maximum number of uses of a promotional code and the total number of uses of the promotional code may be placed in sixth and seventh fields of each promotional code entry 20-N stored in the first region 20a of the memory subsystem 24. As will be more fully described below, in this embodiment of the invention, an otherwise valid promotional code received by the software module 12 will be treated as an invalid promotional code if the total number of uses of the promotional code is equal to the maximum number of uses of the promotional code.

Each time the software module 12 receives a valid promotional code, the software module 12 transfers the product code and the discount amount respectively held in the product code field 20-N-4 and the discount amount field 20-N-5 of the valid promotional code entry 20-N which includes the matching promotional code in the promotional code field 20-N-1, to the software module 14. In turn, the software module 14 holds the product code and corresponding discount amount received from the software module 12 as an interim discounting information entry in a third region 17c of the memory subsystem 22.

Also at the completion of the data entry portion of the transaction, the software module 14 will determine the final cost of the transaction and output the determined total cost of the transaction, for example, via a display included as part of the transactional interface 16. More specifically, the software module 14 compares the product code for each item on the list of items to be purchased which is included as part of the interim transaction information held in the second region 17b of the memory subsystem 22 to the product codes included as part of the interim discounting information held in the third region 17c of the memory subsystem 22. For each match of a product code held in the second region 17b to a product code held in the third region 17c, the software module 14 subtracts the corresponding discount amount held in the third region 17c from the total cost of the transaction held in the second region 17b to determine the final cost of the transaction.

It should be clearly understood that the present invention is suitable for use in a variety of types of consumer transactions. FIGS. 3–6 describe, in detail, the invention in a typical retail environment, i.e., a grocery store, fast food restaurant or other business establishment where a consumer purchases goods or services from a retailer. It is specifically contemplated, however, that the present invention is equally suitable for use in other commercial settings such as the purchase of goods from a vending machine or other automated sales device. While certain automated sales devices are equipped to handle transactions which involve the purchase of plural items, such devices are commonly configured to exclusively handle the sale of single items. Accordingly, the foregoing example is directed to a vending machine equipped to handle transactions comprised of the sales of a single item.

For example, a vending machine may be provided with a keypad or other device which functions as the promotional interface 18 used by the consumer to transmit promotional codes to the software module 12. The vending machine would further include, as its transactional interface 16, the controls used to select the item to be purchased and, as that part of the transactional interface 16 used to indicate, to the software module 14, the initiation of a transaction, a coin slot and/or bill acceptor used to deposit cash in the vending machine and/or a magnetic reader used to provide the software module 14 with credit or debit card information.

Upon detecting the deposit of cash or the receipt of credit/debit card information, the software module 14 notifies the software module 12 to await a promotional code via the promotional interface 18. In response, the software module 12 activates the promotional interface 18. Shortly thereafter, the consumer selects, again via the transactional interface 18, an item to be purchased. For example, the consumer may depress a control button which selects a particular brand of soda for purchase. Upon selection of an item for purchase, the software module 14 transmits a message to the software module 12 that the transaction is complete. In response thereto, the software module 12 deactivates the promotional interface 18.

If the software module 12 received a promotional code via the promotional interface 18 while it was activated, the software module 12 then determines if the received promotional code matches a promotional code stored in the memory subsystem 24 and if the received promotional code is deemed valid. Each time the software module 12 receives a valid promotional code, the software module 12 transfers the product code and the discount amount to the software module 14 where it is held in the memory subsystem 22. The software module 14 then compares the product code for the item selected for purchase to the product code received from the software module 12. If the two match, the software module 14 would refund, to the consumer, the discount amount received from the software module 12. For example, the software module 14 would cause a change return included as part of the transaction interface 18 to dispense an amount, in cash, equal to the discount amount received from the software module 14.

Figure 3:
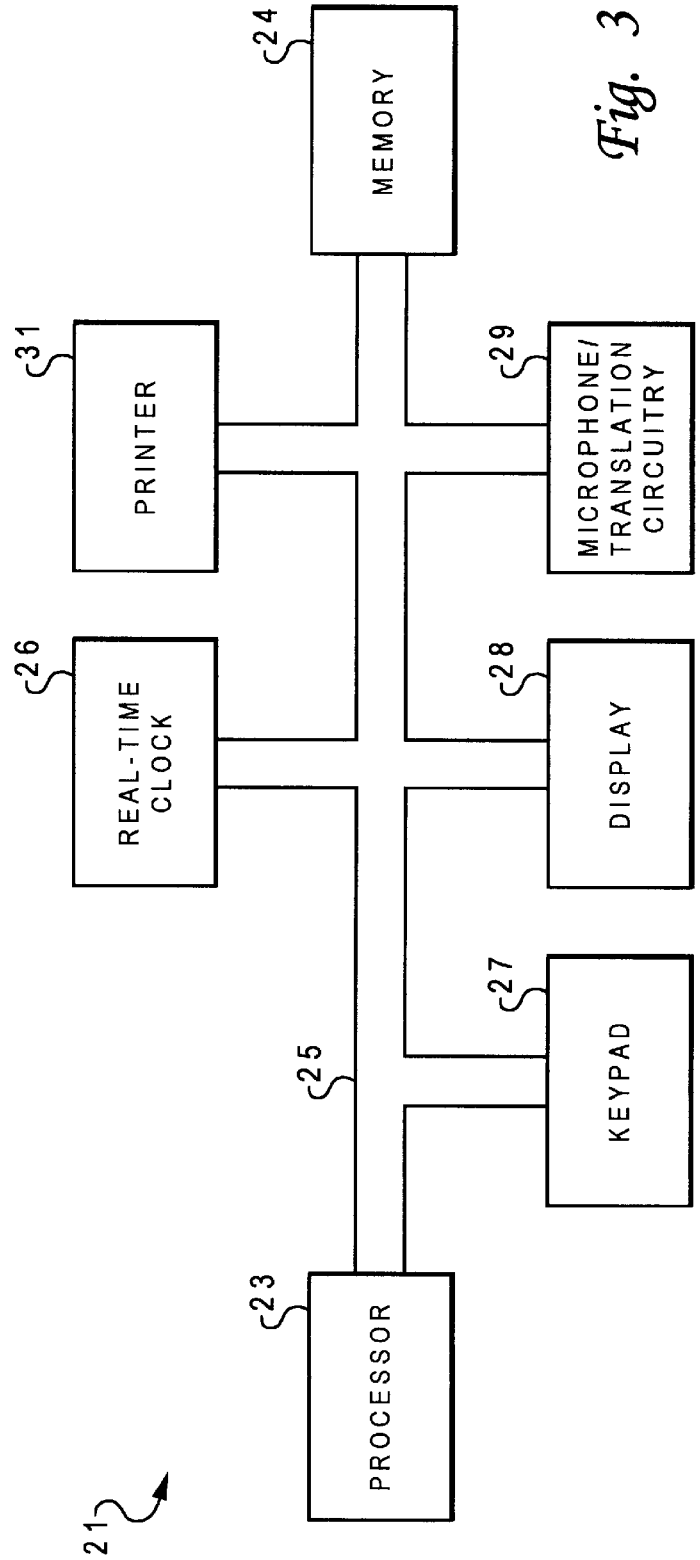
FIG. 3 is a block diagram of a computer system in which the software-based, consumer-provided promotional code actuatable point-of-sale discounting system of FIG. 1 resides.

Referring next to FIG. 3, a computer system 21 in which the software-based, consumer-provided promotional code actuatable point-of-sale discounting system 10 resides may now be seen. The computer system 21 includes a processor subsystem 23 capable of executing the software module 12 and a memory subsystem 24 coupled together by a main system bus 25 for bi-directional exchanges of address, data and control signals. Residing on the system bus are a series of devices which include a real-time clock 26, a keypad 27 or other device such a touch screen with which a series of characters may be entered, a display 28, a microphone 29 and a printer 31. The real-time clock is used to determine the time at which a promotional code is received from the promotional interface 18. The keypad 27, display 28 and microphone 29 are first, second and third portions of the promotional interface 18.

The keypad 27 is the preferred manner by which consumers transmit promotional codes to the processor subsystem 23. Of course, in certain circumstances, it may be desirable for the cashier or other representative of the retailer transmit promotional codes to the consumer, for example, when, due to a faulty recollection, the consumer incorrectly enters the promotional code. Preferably, the keypad 27 includes a promotional code character key for each numerical character 0 through 9 such that a consumer can transmit a numerical promotional code, for example, the promotional code "123" by depressing, in sequence the"1", "2" and "3" keys. The keypad 27 should also include a first control key, for example, the "*" key, the depression of which indicates the start of a promotional code. In alternate aspects thereof, the end of a promotional code may be indicated by a second depression of the first control key, a first depression of a second control key, for example, the "#" key, or by a timeout, i.e., the elapse of a preselected period of time since the last depression of a promotional code character key. In one aspect, the keypad should also include a promotional code character key for each alphabetical character A through Z, as well as a space bar such that a consumer can transmit a alpha or alphanumerical promotional code such as "XYZ IS A1 WITH ME".

In one embodiment of the invention, the computer system 21 further includes the microphone 29, again for transmitting promotional codes to the processor subsystem 23. In this embodiment, the consumer would audibilize the promotional code such that it can be detected by the microphone 29. Preferably, this embodiment of the invention would include appropriate recognition and translation circuitry for recognizing selected audibilizations, for example, the audibilized numbers "1", "2" and "3" spoken in sequence and translation circuitry for converting the recognized audibilization into a digital message suitable for transmission to the processor subsystem 23.

As will be more fully described below, the printer 31 is most commonly used during analysis of consumer response to advertisements which provide the promotional codes used to generate discounts when purchasing items.

The processor subsystem 23 transmits messages containing instructions or feedback to the display 28 where they may be viewed by the consumer using the promotional interface 18. For example, when the promotional interface 18 is activated, the processor subsystem 23 may cause the display 28 to display the message "ENTER PROMOTIONAL CODE NOW!". Preferably, the display 28 is a liquid crystal diode (or "LCD") type display.

Figure 4:
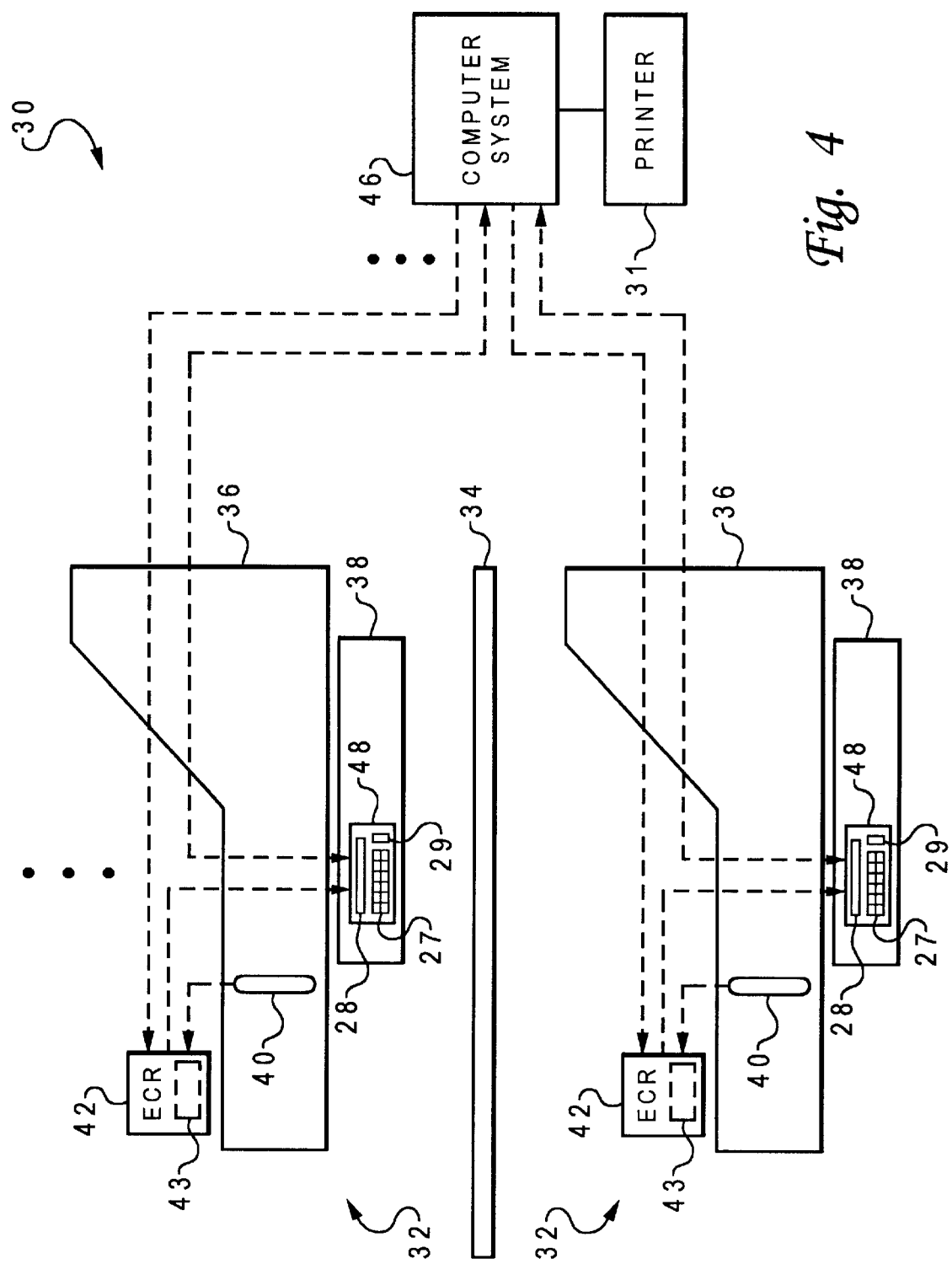
FIG. 4 is top view of a point-of-sale transactional system which incorporates the consumer-provided promotional code actuatable point-of-sale discounting system of FIGS. 1 and 3.

Referring next to FIG. 4, a point-of-sale transactional system 30 which incorporates an embodiment of the software-based point-of-sale discounting system 10 subject of the present invention will now be described in greater detail. In this embodiment, the point-of-sale transactional system 30 is installed in a retail store having multiple stations 32, separated by divider walls 34, each staffed by a cashier or other employee of the retailer. Each station 32 includes a first platform 36 on which items to be purchased are placed and a second platform 38 to be used by the consumer during the transaction. Mounted within the first platform 36 such that it is visible through an opening therein is an optical scanner 40. Preferably, the optical scanner 40, which is a portion of the transactional interface 16 of FIG. 1, is positioned such that items placed on the first platform 36 by the consumer may be passed over the optical scanner 40 such that the UPC code on each item is read by the optical scanner 40 as the product code used to identify the items to be purchased.

In the embodiment of the invention illustrated herein, the point-of-sale transactional system 30 includes a series of electronic cash registers 42, each located at a respective station 32, networked to a computer system 46. Each electronic cash register 42 includes a processor subsystem 43 capable of executing the software module 14 and a memory subsystem 22 (not shown in FIG. 4) for holding the interim transaction information 17b. The processor subsystem 23 which executes the software module 12, the memory subsystem 24 which maintains the valid promotional codes and the real-time clock 26 used to determine when promotional code are located within the computer system 46, the printer 31 is coupled to an output port of the computer system 46, while the keypad 27, the display 28 and the microphone/translation circuitry are located within the consumer terminal 48.

The flow of information and/or control signals within the point-of-sale transactional system 30 is as follows. The optical scanner 40 is linked to the electronic cash register such that information regarding the items to be purchased by the consumer may be transmitted from the optical scanner 40 to the electronic cash register 42. The electronic cash register 42 is linked to a consumer terminal 48 so that, upon initiation of a point-of-sale transaction, the electronic cash register 42 can activate the consumer terminal 48. A bi-directional link between the consumer terminal 48 and the computer system 46 is provided so that promotional codes input the point-of-sale transactional system 30 by the consumer using the consumer terminal 48 may be transmitted to the computer system 46 for validation while advisory messages may be transmitted from the computer system 46 to the consumer terminal 48 for display. Finally, the computer system 46 is linked to the ECR so that, if a received promotional code is validated, a corresponding product code and discount amount may be transmitted from the computer system 46 to the electronic cash register 42 where the cost of the purchased is reduced by the discount amount if the product identified by the product code has been purchased.

In an alternate embodiment of the invention not illustrated herein, both the software module 12 and the valid promotional codes may be maintained within the electronic cash register 43. In this embodiment, the software module 12 would be executed by the processor subsystem 43, the valid promotional codes would be stored in the memory subsystem 22 and the point-of-sale transactional system 30 would operate as a stand-alone system which includes both a transactional device for performing point-of-sale transactions and a discounting device for transmitting discount information to the transactional device. In another embodiment of the invention, both the software module 12 and the valid promotional codes may be maintained within the consumer terminal 48 by incorporating the computer system 21 therein.

Figure 5:
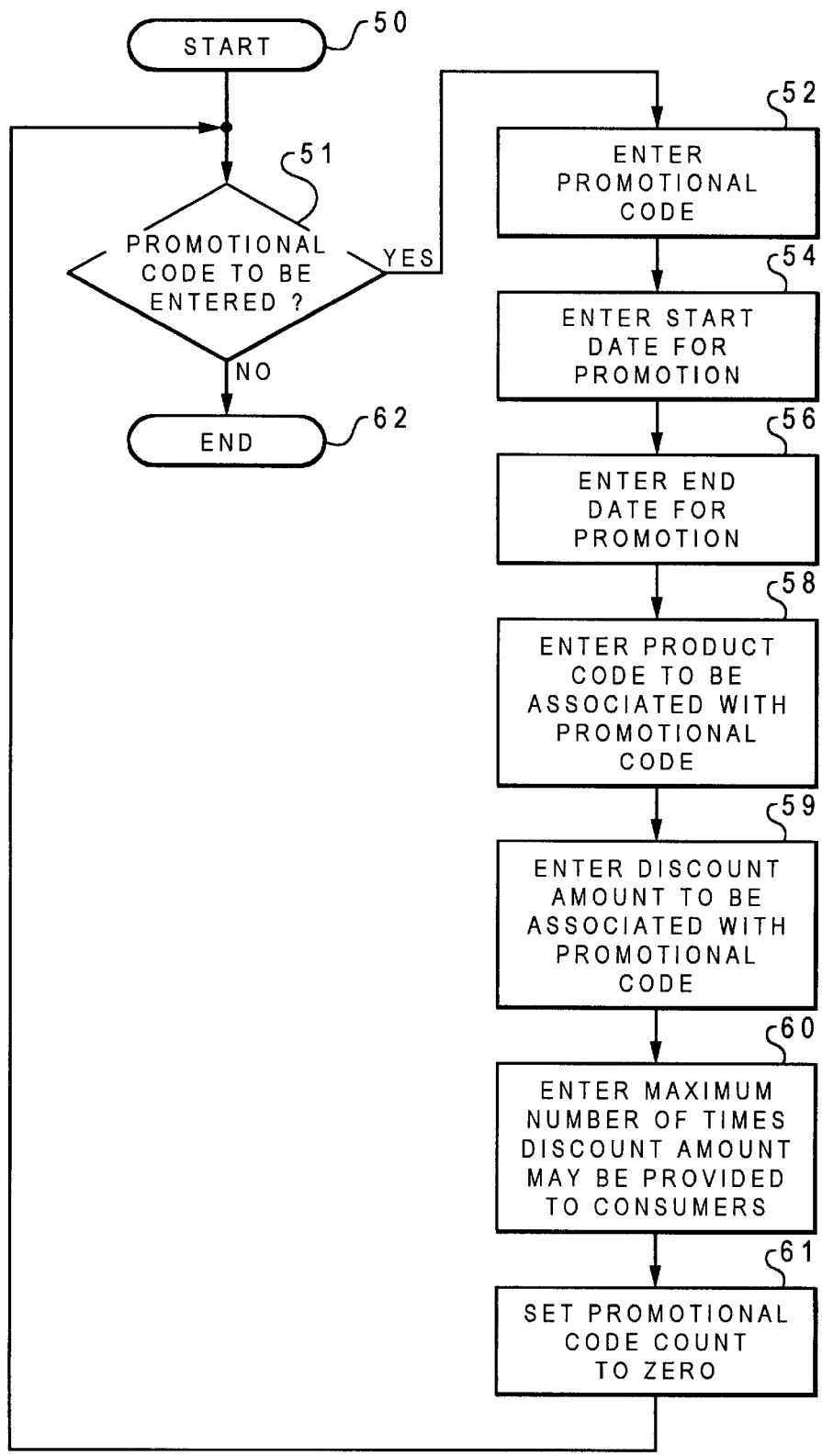
FIG. 5 is a flow chart of a method of entering valid promotional codes into the consumer-provided promotional code actuatable point-of-sale discounting system of FIGS. 1 and 3.

Referring next to FIG. 5, the storage of promotional codes within the memory subsystem 24 will now be described in greater detail. The method starts at step 50 and, proceeding to step 51, a determination is made as to whether information related to a promotional code should be entered into the first region 20a of the memory subsystem 24 as a promotional code entry 20-N. If information related to a promotional code is to be entered into the first region 20a, the method proceeds to step 52 where the promotional code is entered into the promotional code field 20-N-1 of the promotional code entry 20-N. Proceeding to step 54, the day and time at which the promotion starts is entered in the start time/date field 20-N-2 and, at step 56, the date and time at which the promotion ends is entered in the end time/date field 20-N-3.

Continuing on to step 58, a product code for the product for which the promotion is being run is entered in the product code field 20-N-4 and, at step 59, the discount amount to be provided to consumers purchasing the product during the promotion period is entered in the discount field 20-N-5. At step 60, the maximum number of times that the discount amount stored in the discount field 20-N-5 will be given to consumers is entered in the second region 20b of the memory subsystem and a pointer (not shown) from the promotional code entry 20-N to the maximum number of times that the discount amount will be given to consumers is constructed. Proceeding to step 61, the promotional code count, i.e., the total number of times that the discount amount stored in the discount field 20-N-5 is provided to a consumer providing the promotional code, maintained in the third region 20c of the memory subsystem 24 is set to zero. The method then returns to step 51 where a determination is made as to whether information related to a next promotional code is to be entered into the memory subsystem 24. If so, the method returns to step 52 where entry of information related to a next promotional code begins. If all promotions have been entered, the method ends at step 62.

In one embodiment of the invention, the promotional code entries 20-N may include multiple entries having the same promotional code entered in the promotional code field 20-N-1 but different promotional information entered in the other fields, for example, the product code field 20-N-4 and/or the discount field 20-N-5. By doing so, a discount for any member of a product family may be provided by use of a single promotional code.

Generally, each promotional code stored within the memory subsystem 24 will be associated with a single product code. However, as will be more fully described below, in one, particularly novel embodiment of the invention, multiple promotional codes will be associated with a common product code. For example, a first promotional code entered into the memory subsystem 24 as promotional code entry 20-1 may be the promotional code "123". The product code entered in the product code field 20-1-4 may be the UPC code for product "XYZ". Next, a second promotional code entered into the memory subsystem 24 as promotional code entry 20-2 may be the promotional code "124" The product code entered in the product code field 20-2-4 will again be the promotional code "124". In this manner, the point-of-sale discounting system 10 has been configured that two different promotional codes will produce a discount for the same product.

Referring next to FIG. 6, the method of providing point-of-sale discounts to consumers providing a promotional code to a discounting system in accordance with the teachings of the present invention will now be described in greater detail. The method commences at step 70 and, at step 72, a cashier or other representative of a retailer initiates a point-of-sale transaction. For example, a cashier operating an electronic cash register having a keypad would depress a key or combination of keys to transmit a signal to the processor of the electronic cash register of the start of a new transaction.

Proceeding to step 74, upon receipt of a signal indicating the start of a new transaction, in addition to the tasks performed by the processor subsystem 43 in connection with the initiation of a new transaction, the processor subsystem 43 would initiate activation of the consumer terminal 48, for example, by transmitting an "enable consumer terminal" signal to the processor subsystem 23. In response, the processor subsystem 23 would activate the consumer terminal 48, for example, by enabling the keypad 27 and/or other promotional interface devices included as part of the consumer terminal 48 and await receipt of one or more promotional codes from the consumer terminal 48. In addition to enabling the keypad 27 such that electronic representations of the alphanumeric characters depressed thereon will be transmitted to the processor subsystem 23 coupled thereto, the processor subsystem 23 may also transmit a visual and/or audible indicator that it will now accept promotional codes. For example, the processor subsystem 23 may generate a message such as "TO SAVE MONEY, ENTER CODE NOW!" on the display 28.

In various alternate embodiments of the invention, promotional codes may be provided to the processor subsystem 23 using input devices other than the keypad 27. For example, the microphone 29 may be used to transmit promotional codes to the processor subsystem 23. Of course, rather than generating signals, interpretable by the processor subsystem 23, as to which keys on the keypad 27 have been depressed, the microphone 29 would also circuitry which compares detected audible sounds to a series of recognizable audible sounds and translates detected audible sounds matching a previously stored recognizable sound into an electrical signal for transmission to the processor subsystem 23. Preferably, each promotional code is comprised of three or four alphanumeric characters. For example, "123" may be one such promotional code suitable for entry on the keypad 27. Even more preferably, the promotional code should be preceded by a header which indicates that a promotional code follows. For example, "*" would a header code suitable for entry on the keypad 27.

Having activated the consumer terminal 48, the method proceeds to step 76 where the cashier begins entering selected information related to items to be purchased by the consumer into the electronic cash register 42. For example, the cashier may transmit the UPC code of each item to be purchased to the electronic cash register 42 by passing each item over the scanner 40. While the transaction is on-going, the software module 12 awaits receipt of one or more promotional codes from the consumer terminal 48 at step 78. If a promotional code is transmitted from the consumer terminal 48 to the software module 12, for example, by the consumer entering a promotional code using the keypad 27, the method proceeds to step 80 where the software module 12 determines if the received promotional code is valid.

A received promotional code is characterized as valid if the received promotional code matches a promotional code stored in the memory subsystem 24 and was received during the promotional period. Thus, upon receipt of a promotional code from the consumer terminal 48, the software module 12 compares the received promotional code to the promotional codes stored in the promotional code fields 20-N-1. If the received promotional code matches one of the promotional codes stored in the promotional code fields 20-N-1, the software module 12 then determines if the promotional code was received after the time/date stored in the promotion start time/date field 20-N-2 but before the time/date stored in the promotion end time/date field 20-N-3 corresponding to the promotional code field 20-N-1 previously determined as matching the received promotional code.

Continuing on to step 82, if the received promotional code fails to match any of the promotional codes stored in the promotional code fields 20-N-1 or if the received promotional code matches one of the promotional codes stored in the promotional code fields 20-N-1 but was received either before the time/date contained in the start time/date field 20-N-2 corresponding to the promotional code field 20-N-1 matching the received promotional code or after the time/date contained in the end time/date field 20-N-3 corresponding to the promotional code field 20-N-1 matching the received promotional code, the received promotional code is rejected by the software module 12 as invalid. The software module 12 issues a rejection message, for example, "PROMOTIONAL CODE NOT VALID" to the display 28 and discards the received promotional code. The method then returns to step 78 to await entry of a next promotional code at the consumer terminal 48.

Returning to step 80, if, however, the received promotional code matches one of the promotional codes stored in the promotional code fields 20-N-1 and the received promotional code was received after the time/date contained in the start time/date field 20-N-2 corresponding to the promotional code field 20-N-1 matching the received promotional code and before the time/date contained in the end time/date field 20-N-3 corresponding to the promotional code field 20-N-1 matching the received promotional code, the method proceeds to step 81 where the software module 12 increments the promotional code count by one and on to step 83 where the software module 12 determines if the promotional code count is less than or equal to the maximum number of promotional codes. If the promotional code count is greater than the maximum number of promotional codes, the method returns to step 82 where the received promotional code is rejected by the software module 12 as invalid. If, however, the promotional code count is less than or equal to the maximum number of promotional codes, the method proceeds to step 84 where the received promotional code is accepted by the software module 12. The software module 12 issues an acceptance message, for example, "PROMOTIONAL CODE ACCEPTED" to the display 28 and, proceeding to step 86, transfers the received promotional code, together with the product code stored in the product code field 20-N-4 and the discount amount stored in the discount field 20-N-5 corresponding to the product code field 20-N-1 matching the received product code, to the software module 14 residing within the processor of the electronic cash register 42. The method then returns to step 78 to await entry of a next promotional code at the consumer terminal 48. Of course, if multiple promotional code entries 20-N have the same promotional code in promotional code field 20-N-1, then all of the promotional code entries 20-N having the matching promotional code are transferred to the software module 14.

The foregoing process is repeated for each promotional code entered at the consumer terminal 48 during the data entry portion of the transaction. If no more promotional codes are received from the consumer terminal 48 during the data entry portion of the transaction, the method proceeds to step 88 where the cashier ends the entry of information related to the transaction, for example, by depressing a transaction end key. Proceeding to step 90, upon detection of the end of the data entry portion of the transaction, the software module 14 subtotals the cost of the items to be purchased during the transaction. In addition, the software module 14 deactivates the consumer terminal 48 from receiving any further promotional codes. More specifically, the software module 14 initiates deactivation of the consumer terminal 48, for example, by transmitting an "disable consumer terminal" signal to the processor 23. In response, the processor subsystem 23 would deactivate the consumer terminal, for example, by disabling the keypad 27 and/or other input devices included as part of the consumer terminal 48. Additionally, the processor subsystem 23 may also transmit an visual or audible indicator that it will no longer accept promotional codes. For example, the processor 23 may generate a message such as "PROCESSING PROMOTIONAL CODES NOW" on the display 48.

At step 92, the software module 14 reduces the interim cost of the transaction by the discount amounts contained in the discount fields 20-N-5 if the products corresponding to the accepted promotional codes were actually purchased by the consumer. More specifically, for each product code received from the first software module 12, the second software module compares the product code to the product codes for each item purchased during the transaction. If a match to the received product code is identified among the product codes for the purchased items, the interim cost of the transaction is reduced by the discount amount contained in the discount field 20-N-5 corresponding to the matching product code contained in the product code field 20-N-4. In addition to filtering out discount amounts and product codes associated with promotional codes entered for products not actually purchased by a consumer, where multiple product codes, i.e., a product family, have the same promotional code, the aforementioned process will filter out discount amounts and product codes for those products in a product family not actually purchased by the consumer. Thus, two promotional code entries 20-N may have the same promotional codes but different product codes and different discount amounts. However, only the discount amount corresponding to the product actually purchased shall be applied to the cost of the point-of-sale transaction.

After reducing the interim cost of the transaction by the selected discount amounts, the method proceeds to step 94 where the total cost of the transaction is determined by the software module 14 and the point-of-sale transaction completed. The method then proceeds to step 96 where a determination is made whether any analysis of the provided discounts is desired. If not, the method ends at step 100.

Returning now to step 96, the method by which analysis of the provided discounts is accomplished shall now be described in greater detail. Generally, it would be preferred that analysis be accomplished after hours when consumers will no longer be attempting to purchase goods. Analysis of the provided discounts may be performed from the consumer terminal 48 if the entire computer system 21 is incorporated therein or from the computer system 46 if the processor subsystem 23, the memory subsystem 24 and the real-time clock 26 reside therein.

Thus far, the use of promotional codes, entered by consumers at the consumer terminal 48, to receive discounts on items being purchased has been disclosed at length. In most cases, consumers will enter the retailer's establishment knowing one or more promotional codes and will enter the promotional codes during the point-of-sale transaction. It is contemplated that consumers will learn the promotional codes from advertisements run by the retailer in the print, radio or television media. For example, a print advertisement may state that the consumer will receive $1.00 off product "XYZ" if he or she enters the code "123" during their purchase. Generally, a single promotional code is associated with each product for which discounts are available. However, should the retailer decide to associate multiple promotional codes with a single product, considerable information regarding the success of alternate advertising campaigns may be derived from the discounting information accumulated by the computer system 46.

For example, when entering promotional codes into the memory subsystem 24, promotional codes "123" and "124" may be associated with a $1.00 discount when purchasing item "XYZ". However, promotional code "123" may be printed in an advertisement running in a daily newspaper while the promotional code "124" may be printed in a weekly entertainment magazine. Thus, consumers who decide to purchase the item based upon the advertisement in the daily newspaper will use one promotional code to receive the discount while consumers who decide to purchase the item based upon the advertisement in the weekly magazine will use a different promotional code to receive the discount.

Thus, if analysis of the provided discounts is desired at step 96, the method proceeds to step 98 for analysis. Analysis of the provided discounts may be initiated by transmitting an instruction to the processor subsystem 23, for example, by depressing an analyze discounts "hot key" provided on the consumer terminal 48. Upon receiving the analyze instruction, the processor subsystem 23 will retrieve the promotional code counts stored in the third region 20c of the memory subsystem 24 for each promotional code stored in the first region 20a of the memory subsystem 24. The retrieved list of promotional codes and associated promotional code counts may then be sent to the printer 31 or otherwise displayed for review. Of course, the other information (promotion period, product code and discount amount) associated with each promotional code may also be included in the list.

By reviewing the produced list of promotional codes and associated promotional code counts, considerable information regarding the relative success of advertising campaigns may be derived. For example, if 10,000 consumers entered the promotional code advertised in the daily newspaper while only 150 consumers entered the promotional code advertised in the weekly entertainment magazine, it may be readily ascertained that the advertised product is not particularly appealing to the demographic group who purchase and read the weekly entertainment magazine. Thus, by analyzing the list of promotional codes and associated promotional code counts, a retailer may readily discern which advertising media is best equipped to reach consumers of various goods. Upon completing analysis of the list of promotional codes and associated promotional code counts at step 98, the method ends at step 100.

While we have disclosed how the use of multiple promotional codes for a single product may provide useful information as to the relative success of various advertising media, it should be clearly understood that innumerable types of market research may be performed by storing various combinations of promotional codes, promotion period, product codes and discount amounts as promotional code entries 20-N. For example, some discount amounts may be more successful in catching the consumer's attention than others. For example, a 99 cent discount may be a better attention grabber than a $1.00 discount. By associating a first discount amount for a first product with a first promotional code, associating a second discount amount for the first product with a second promotional code and distributing both promotions in the media equally, the retailer can determine the preferred discount amount for the product by analyzing the promotional code counts for the two promotion codes.

Thus, there has been described and illustrated herein, a point-of-sale transactional system in which a discount is applied to a transaction in response to a consumer providing a promotional code to a discounting system associated with the point-of-sale transactional system. By providing the aforementioned system, a discounting system having a number of characteristics advantageous to retailers has been designed. Specifically, by requiring the consumer to provide a promotional code advertised in the media in order to receive a discount upon purchasing the advertised goods, the retailer can provide the discount only to those consumers whose purchase is motivated by the discount while selling the goods at full price to those consumers whose purchase is unmotivated by the promotion. Thus, the cost, to the retailer, for promoting the sale of goods using discounts can be substantially reduced. However, those skilled in the art will recognize that many modifications and variations besides those specifically mentioned herein may be made without departing substantially from the concept of the present invention. Accordingly, it should be clearly understood that the form of the invention described herein is exemplary only and is not intended as a limitation on the scope of the invention.

What is claimed is:

1. A computer-implemented discounting system for use in conjunction with a point-of-sale transaction device, comprising:

a device which accepts promotional codes entered as a series of characters;

a memory subsystem, said memory subsystem storing information related to at least one promotion, said information comprised of a promotional code, a product code and a discount amount for each one of said at least one promotion;

a software module, coupled to said device and said memory subsystem;

said software module receiving said promotional codes entered by consumers using said device, using said information held in said memory subsystem to determine if said entered promotional codes relates to one or more of said at least one promotion and transmitting discount information for said promotions related to said entered promotional codes to said point-of-sale transaction device, and wherein said software module compares said received promotional codes with said promotional codes stored in said memory subsystem and, if said received promotional codes match one of said promotional codes stored in said memory subsystem, said software module transfers said product code and said discount amount corresponding to said matched promotional code to said point-of-sale transactional device.

2. A computer-implemented discounting system according to claim 1 wherein said information, stored in said memory subsystem, related to at least one promotion further comprises a promotion period for each of said at least one promotion and wherein said software module determines, if said received promotional code matches one of said promotional codes stored in said memory subsystem, if said received promotional code was received during said promotion period corresponding to said matching promotional code and transfers said product code and said discount amount corresponding to said matched promotional code to said point-of-sale transactional device only if said received promotional code was received during said promotion period.

3. A computer-implemented discounting system according to claim 1 wherein said information, stored in said memory subsystem, related to at least one promotion further comprises, for each of said at least one promotion, a promotional code count of a total number of times that said promotional code has been received and a maximum number of promotional codes and wherein said software module determines, if said received promotional code matches one of said promotional codes stored in said memory subsystem, if said corresponding promotional code count exceeds said maximum number of promotional codes has been received and transfers said discount amount corresponding to said matched promotional code to said point-of-sale transactional device only if said promotional code count does not exceed said maximum number of promotional codes.

4. A computer-implemented discounting system for use in conjunction with a point-of-sale transaction device, comprising:

a keypad for accepting promotional codes entered by consumers;

a memory subsystem, said memory subsystem storing information related to at least one promotion;

a software module, coupled to said keypad and said memory subsystem;

said software module receiving said promotional codes entered by consumers using said keypad, using said information held in said memory subsystem to determine if said entered promotional codes relates to one or more of said at least one promotion and transmitting discount information for said promotions related to said entered promotional codes to said point-of-sale transaction device.

5. A computer-implemented discounting system according to claim 4 wherein said keypad includes a plurality of keys, each representing an alpha-numeric character.

6. A computer-implemented discounting system according to claim 4 wherein said information, stored in said memory subsystem, related to at least one promotion is comprised of a promotional code, a product code and a discount amount for each one of said at least one promotion.

7. A computer-implemented discounting system according to claim 6 wherein said software module compares said received promotional codes with said promotional codes stored in said memory subsystem and, if said received promotional codes match one of said promotional codes stored in said memory subsystem, said software module transfers said product code and said discount amount corresponding to said matched promotional code to said point-of-sale transactional device.

8. A computer-implemented discounting system according to claim 7 wherein said information, stored in said memory subsystem, related to at least one promotion further comprises a promotion period for each of said at least one promotion.

9. A computer-implemented discounting system according to claim 8 wherein said software module determines, if said received promotional code matches one of said promotional codes stored in said memory subsystem, if said received promotional code was received during said promotion period corresponding to said matching promotional code and transfers said product code and said discount amount corresponding to said matched promotional code to said point-of-sale transactional device only if said received promotional code was received during said promotion period.

10. A computer-implemented discounting system according to claim 7 wherein said information, stored in said memory subsystem, related to at least one promotion further comprises a promotion start time/date and a promotion end time/date for each of said at least one promotion.

11. A computer-implemented discounting system according to claim 10 wherein said software module determines, if said received promotional code matches one of said promotional codes stored in said memory subsystem, if said received promotional code was received after said promotion start time/date and before said promotion end time/date corresponding to said matching promotional code and transfers said product code and said discount amount corresponding to said matched promotional code to said point-of-sale transactional device only if said received promotional code was received after said promotion start time/date and before said promotion end time/date.

12. A computer-implemented discounting system according to claim 7 wherein said information, stored in said memory subsystem, related to at least one promotion further comprises, for each of said at least one promotion, a promotional code count of a total number of times that said promotional code has been received and a maximum number of promotional codes.

13. A computer-implemented discounting system according to claim 12 wherein said software module determines, if said received promotional code matches one of said promotional codes stored in said memory subsystem, if said corresponding promotional code count exceeds said maximum number of promotional codes has been received and transfers said discount amount corresponding to said matched promotional code to said point-of-sale transactional device only if said promotional code count does not exceed said maximum number of promotional codes.

14. A computer-implemented discounting system according to claim 13 wherein said keypad includes a plurality of keys, each representing an alpha-numeric character and wherein each one of said promotional codes is comprised of a different series of alpha-numeric characters generated by depressing selected ones of said plurality of keys.

15. A computer-implemented discounting system according to claim 7 and further comprising:

a processor subsystem, coupled to said keypad and said memory subsystem;

said software module executable by said processor subsystem.

16. A computer-implemented discounting system according to claim 15 wherein said keypad further includes a key which, when depressed, indicates that said series of alpha-numeric characters generated by depressing selected ones of said plurality of keys thereafter, is a promotional code.

17. A computer-implemented discounting system for use in conjunction with a point-of-sale transaction device, comprising:

a microphone for accepting promotional codes audibilized by consumers;

means for converting said audibilized promotional codes into corresponding digital messages;

a memory subsystem, said memory subsystem storing information related to at least one promotion;

a software module, coupled to said converting means and said memory subsystem;

said software module receiving said digital messages corresponding to said promotional codes audibilized by consumers using said microphone, using said information held in said memory subsystem to determine if said received digital messages relate to one or more of said at least one promotion and transmitting discount information for said promotions related to said received digital messages to said point-of-sale transaction device.

18. A computer-implemented discounting system according to claim 17 wherein said information, stored in said memory subsystem, related to at least one promotion is comprised of a promotional code, a product code and a discount amount for each one of said at least one promotion.

19. A computer-implemented discounting system according to claim 18 wherein said software module compares said received digital messages with said promotional codes stored in said memory subsystem and, if said received digital messages match one of said promotional codes stored in said memory subsystem, said software module transfers said product code and said discount amount corresponding to said matched promotional code to said point-of-sale transactional device.

20. A computer-implemented discounting system according to claim 19 wherein said information, stored in said memory subsystem, related to at least one promotion further comprises a promotion period for each of said at least one promotion.

21. A computer-implemented discounting system according to claim 20 wherein said software module determines, if said received promotional code matches one of said promotional codes stored in said memory subsystem, if said received promotional code was received during said promotion period corresponding to said matching promotional code and transfers said product code and said discount amount corresponding to said matched promotional code to said point-of-sale transactional device only if said received promotional code was received during said promotion period.

22. A computer-implemented discounting system according to claim 21 wherein said information, stored in said memory subsystem, related to at least one promotion further comprises, for each of said at least one promotion, a promotional code count of a total number of times that said promotional code has been received and a maximum number of promotional codes.

23. A computer-implemented discounting system according to claim 22 wherein said software module determines, if said received digital message matches one of said promotional codes stored in said memory subsystem, if said corresponding promotional code count exceeds said maximum number of promotional codes has been received and transfers said discount amount corresponding to said matched promotional code to said point-of-sale transactional device only if said promotional code count does not exceed said maximum number of promotional codes.

24. A point-of-sale transactional system, comprising:
a transactional device for performing point-of-sale transactions;
a consumer interface for accepting codes entered by consumers;
a discounting device, coupled to said consumer interface and said transactional device, said discounting device including a first software module which receives codes from said consumer interface, determines if said received codes are promotional codes and transmits discount information, for each determined promotional code, to said transactional device;
said transactional device including a second software module which performs said point-of-sale transaction using said discount information received from said discounting device.

25. A point-of-sale transactional system according to claim 24 wherein said transactional device further comprises:
means for activating said discounting device upon initiation of a data entry portion of a point-of-sale transaction and deactivating said discounting device upon completion of said data entry portion of said point-of-sale transaction;
said discounting device capable of accepting codes from consumers only when activated.

26. A point-of-sale transactional system according to claim 24 wherein said discounting device further comprises:
a memory subsystem coupled to said first software module, said memory subsystem storing at least one promotional code and a discount amount for each of said at least one promotional code stored therein;
said first software module comparing said received codes with said at least one promotional code stored in said memory subsystem and transmitting said discount amount corresponding to a first one of said at least one promotional code to said second software module if said received code matches said first one of said at least one promotional code.

27. A point-of-sale transactional system according to claim 24 wherein said discounting device further comprises:
a memory subsystem coupled to said first software module, said memory subsystem storing at least one promotional code and a promotion period and a discount amount for each of said at least one promotional code stored therein;
said first software module comparing said received codes with said at least one promotional codes stored in said memory subsystem, validating said received code and transmitting said discount amount corresponding to a first one of said at least one promotional codes to said second software module if said received code matches said first one of said at least one promotional codes and was received during said promotion period.

28. A point-of-sale transactional system according to claim 24 wherein said discounting device further comprises:
a memory subsystem coupled to said first software module, said memory subsystem storing at least one promotional code and a promotion period, a product code and a discount amount for each of said at least one promotional code stored therein;
said first software module comparing said received codes with said at least one promotional codes stored in said memory subsystem, validating said received code and transmitting said product code and said discount amount corresponding to a first one of said at least one promotional codes to said second software module if said received code matches said first one of said at least one promotional codes and was received during said promotion period;
said second software module determining a cost of said point-of-sale transaction and reducing said cost by said discount amount if an item having said product code transmitted to said second software module was purchased during said point-of-sale transaction.

29. A point-of-sale transactional system according to claim 24 wherein said discounting device further comprises:
a memory subsystem coupled to said first software module, said memory subsystem storing at least one promotional code and a promotional code, a promotion period, a product code, a discount amount, a promotional code count of a total number of times that said promotional code has been received and a maximum number of promotional codes for each one of said at least one promotional code stored therein;
said first software module comparing said received codes with said at least one promotional codes stored in said memory subsystem, validating said received code and transmitting said product code and said discount amount corresponding to a first one of said at least one promotional codes to said second software module if said received code matches said first one of said at least one promotional codes, was received during said promotion period and said promotional code count does not exceed said maximum number of promotional codes;

said second software module determining a cost of said point-of-sale transaction and reducing said cost by said discount amount if an item having said product code transmitted to said second software module was purchased during said point-of-sale transaction.

30. A computer-implemented method of discounting an on-going point-of-sale transaction performed by a point-of-sale transactional device, comprising the steps of:

storing, in a memory subsystem of a computer system, a series of promotional codes and a corresponding series of promotional information entries;

receiving a promotional code entered on a keypad, coupled to said computer system, by a consumer;

comparing said received promotional code to said series of promotional codes stored in said memory subsystem;

if said received promotional code matches one of said series of stored promotional codes, transmitting said promotional information entry corresponding to said matched promotional code to said point-of-sale discounting device; and discounting the cost of said point-of-sale transaction using said transmitted promotional information.

31. A computer-implemented method of discounting an on-going point-of-sale transaction according to claim 30 wherein said transmitted promotional information includes a product code and a discount amount.

32. A computer-implemented method of discounting an on-going point-of-sale transaction according to claim 31 and further comprising the steps of:

storing a product code for each product to be purchased as part of said point-of-sale transaction;

comparing said transmitted product code to each of said stored product codes; and discounting the cost of said point-of-sale transaction by said discount amount if said transmitted product code matches one of said stored product codes.

33. A computer-implemented method of discounting an on-going point-of-sale transaction according to claim 32 wherein each of said promotional information entries stored in said memory subsystem further comprise a promotion period.

34. A computer-implemented method of discounting an on-going point-of-sale transaction according to claim 33 and further comprising the steps of:

determining whether said received promotional code matching one of said series of stored promotional codes was received within said corresponding promotion period; and transmitting said product code and discount amount corresponding to said matched promotional code only if said received promotional code was received within said corresponding promotion period.

35. A computer-implemented method of discounting an on-going point-of-sale transaction according to claim 34 wherein each promotion period is comprised of a promotion start time/date and a promotion end time/date.

36. A computer-implemented method of discounting an on-going point-of-sale transaction according to claim 35 and further comprising the steps of:

determining whether said received promotional code matching one of said series of stored promotional codes was received after said corresponding promotion start time/date but before said corresponding promotion end time/date; and transmitting said product code and discount amount corresponding to said matched promotional code only if said received promotional code was received after said corresponding promotion start time/date but before said corresponding promotion end time/date.

37. A computer-implemented method of discounting an on-going point-of-sale transaction according to claim 34 wherein each of said promotional information entries stored in said memory subsystem further comprise a promotional code count of a total number of times that said promotional code has been received and a maximum number of promotional codes.

38. A computer-implemented method of discounting an on-going point-of-sale transaction according to claim 37 and further comprising the steps of:

incrementing said promotional code count corresponding to said stored promotional code matching said received promotional code;

determining whether said promotional code count corresponding to said matching promotional code exceeds said maximum number of promotional codes for said corresponding matching promotional codes; and transmitting said product code and discount amount corresponding to said matched promotional code only if said promotional code count does not exceed said maximum number of promotional codes.

* * * * *